(12) United States Patent
Ogihara et al.

(10) Patent No.: US 10,543,635 B2
(45) Date of Patent: Jan. 28, 2020

(54) APPARATUS FOR MOLDING HANDLE-EQUIPPED CONTAINER, AND MOLD AND MOLD UNIT FOR USE IN SAME

(71) Applicant: NISSEI ASB MACHINE CO., LTD., Nagano (JP)

(72) Inventors: Shuichi Ogihara, Nagano (JP); Masayuki Usami, Nagano (JP); Atsushi Nishiyama, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 111 days.

(21) Appl. No.: 14/392,241

(22) PCT Filed: Jun. 26, 2014

(86) PCT No.: PCT/JP2014/067053
§ 371 (c)(1),
(2) Date: Dec. 24, 2015

(87) PCT Pub. No.: WO2014/208692
PCT Pub. Date: Dec. 31, 2014

(65) Prior Publication Data
US 2016/0176098 A1     Jun. 23, 2016

(30) Foreign Application Priority Data
Jun. 28, 2013   (JP) ................................ 2013-137345

(51) Int. Cl.
*B29C 49/42* (2006.01)
*B29C 49/20* (2006.01)
(Continued)

(52) U.S. Cl.
CPC .......... *B29C 49/4205* (2013.01); *B29C 49/20* (2013.01); *B29C 49/28* (2013.01);
(Continued)

(58) Field of Classification Search
CPC ........ B29C 49/4205; B29C 2049/4221; B29C 49/4215; B29C 2049/2039;
(Continued)

(56) References Cited

U.S. PATENT DOCUMENTS

| 4,952,133 A | 8/1990 | Hasegawa et al. |
| 6,444,158 B1 | 9/2002 | Grob et al. |

(Continued)

FOREIGN PATENT DOCUMENTS

| CN | A1564735 A | 7/2003 |
| FR | 2796591 A1 | 1/2001 |

(Continued)

OTHER PUBLICATIONS

Partial machined translation of FR 2796591 A1 dated Jan. 26, 2001 obtained from the espace website. (Year: 2001).*

(Continued)

*Primary Examiner* — Robert B Davis
(74) *Attorney, Agent, or Firm* — David L. Hoffman; Hoffman Patent Group (57) ABSTRACT

An apparatus for molding a handle-equipped container is provided. The apparatus has a gripping mechanism section 160*a* which comprises a first gripping member 161 having a pair of first chuck members 163 for grasping a preform 200, and a second gripping member 162 having a pair of second chuck members 167 for grasping a container handle 20 in association with the action of the first gripping member 161. The apparatus can simultaneously grasp a plurality of the preforms 200 and a plurality of the container handles 20 and reliably transport them to a blow molding section.

4 Claims, 12 Drawing Sheets

(51) Int. Cl.
   *B29C 49/28* (2006.01)
   *B29K 67/00* (2006.01)
   *B29C 49/48* (2006.01)
   *B29K 105/20* (2006.01)
   *B29L 22/00* (2006.01)
   *B29L 31/00* (2006.01)

(52) U.S. Cl.
   CPC ...... *B29C 49/48* (2013.01); *B29C 2049/2017* (2013.01); *B29C 2049/2039* (2013.01); *B29C 2049/2082* (2013.01); *B29C 2049/4221* (2013.01); *B29C 2049/4869* (2013.01); *B29K 2067/003* (2013.01); *B29K 2105/20* (2013.01); *B29L 2022/00* (2013.01); *B29L 2031/7158* (2013.01)

(58) Field of Classification Search
   CPC .... B29C 2049/2078; B29C 2049/2082; B29C 2049/4879; B29C 2049/4869; B65D 23/106
   See application file for complete search history.

(56) References Cited

U.S. PATENT DOCUMENTS

| | | | |
|---|---|---|---|
| 8,153,048 | B2 | 4/2012 | Imatani et al. |
| 9,511,532 | B2 * | 12/2016 | Ogihara ................. B29C 49/20 |
| 2005/0115919 | A1 | 6/2005 | Itokawa et al. |
| 2006/0021960 | A1 | 2/2006 | Itokawa et al. |

FOREIGN PATENT DOCUMENTS

| | | |
|---|---|---|
| JP | 7080921 | 3/1995 |
| JP | 7276478 | 10/1995 |
| JP | 09-085811 | 3/1997 |
| JP | 9300440 | 11/1997 |
| JP | 11-070569 | 3/1999 |
| JP | 3599851 | 9/2004 |
| WO | 2013027692 | 2/2013 |
| WO | WO2013027692 A1 | 2/2013 |

OTHER PUBLICATIONS

European Search Report dated Aug. 22, 2016, for Application No. 14816950.1-1706/3015247.
International Search Report dated Aug. 26, 2014 for Appln. No. PCT/JP2014/067053 (2 pages).
Japanese Office Action dated Apr. 25, 2018, Application No. 2016238014.
Chinese Office Action dated Apr. 11, 2019, Application No. 2017109542983.

* cited by examiner

APPARATUS FOR MOLDING HANDLE-EQUIPPED CONTAINER, AND MOLD AND MOLD UNIT FOR USE IN SAME

This application is a U.S. national stage application of International Patent Application No. PCT/JP2014/067053, having an international filing date of Jun. 26, 2014, which designated the United States and which claims priority from Japanese Patent Application No. 2013-137345, filed on Jun. 28, 2013, the entirety of both of which are incorporated herein by reference.

TECHNICAL FIELD

This invention relates to an apparatus for molding a handle-equipped container, the apparatus being adapted to form handle-equipped containers while continuously transporting injection-molded preforms and container handles; and a mold and a mold unit for use in the apparatus.

BACKGROUND ART

As containers using resin materials such as polyethylene terephthalate (PET), there have so far been those integrated with handles for easier handling. Such a handle-equipped container is formed by disposing a handle for a container (will be hereinafter referred to as a container handle), together with a preform, within a blow cavity mold, and blow molding the preform in this state.

Various methods are available for arranging the preform and the container handle within the blow cavity mold. An example of molding apparatuses using these methods is configured to insert a pin of a plug-in holder into a locking portion of a handle (container handle) to hold the handle individually on the plug-in holder, and move the plug-in holder in this state to dispose the handle within the blow cavity mold (mold for molding; see Patent Document 1).

PRIOR ART DOCUMENTS

Patent Documents

Patent Document 1: Japanese Patent No. 3599851

SUMMARY OF THE INVENTION

Problems to be Solved by the Invention

With the above-mentioned molding apparatus, in order to carry the container handle into the mold independently of the preform, there is need to adjust the placement of the container handle for each carry-in.

In molding a plurality of handle-equipped containers simultaneously by the molds for molding, moreover, a plurality of the container handles have to be inserted individually into the respective molds, thus posing the possibility of making the arrangement of the container handles more unstable. In addition, if the container handles are carried into the molds independently of the preforms, a blow molding cycle time is likely to lengthen.

The present invention has been accomplished in light of the above-mentioned circumstances. It is an object of this invention to provide an apparatus for molding a handle-equipped container, the apparatus being capable of grasping a plurality of preforms and a plurality of container handles simultaneously, and transporting them reliably to a blow molding section; and a mold and a mold unit for use in the apparatus.

Means for Solving the Problems

A first aspect of the present invention lies in an apparatus for molding a handle-equipped container, the apparatus comprising: a blow molding section for blow molding a preform, with the preform and a container handle being arranged within a mold, to form a handle-equipped container; and a transport section for transporting the preform and the container handle to the blow molding section, wherein the transport section has a gripping mechanism transport section that allows a gripping mechanism section to grasp a neck of the preform and the container handle, and that moves the gripping mechanism section to transport the preform and the container handle, and the gripping mechanism section comprises a first gripping member having a pair of first chuck members for grasping the preform, and a second gripping member having a pair of second chuck members for grasping the container handle in association with the action of the first gripping member.

A second aspect of the present invention lies in the apparatus for molding a handle-equipped container according to the first aspect, wherein the first chuck member is supported rectilinearly movably by a support member, the second chuck member is supported vertically pivotably by the first chuck member and is coupled to the support member to constitute a link mechanism, and the second chuck member is pivoted in association with the rectilinear movement of the first chuck member.

A third aspect of the present invention lies in a mold for use in the apparatus for molding a handle-equipped container according to the first or second aspect, wherein the mold has a retreat portion permitting the movement of the second chuck member associated with the action of the first chuck member.

A fourth aspect of the present invention lies in the mold according to the third aspect, wherein the retreat portion is formed in a slit shape.

A fifth aspect of the present invention lies in a mold unit which is composed of a plurality of the molds according to the third aspect engaged with each other for integration, and which can simultaneously form a plurality of the containers, wherein a cutout is formed in a corner of one of the molds adjacent to each other, and the retreat portion is defined between the adjacent molds by the cutout.

Effects of the Invention

According to the present invention, the plurality of preforms and the plurality of container handles can be grasped at the same time, and transported reliably to the blow molding section. Thus, the manufacturing efficiency is increased, and the yield is increased, so that the costs can be cut down.

MODE FOR CARRYING OUT THE INVENTION

An embodiment of the present invention will now be described in detail with reference to the accompanying drawings.

First of all, an explanation will be presented for an example of a handle-equipped container provided with a container handle produced by the molding apparatus according to the present invention.

Figure 1:
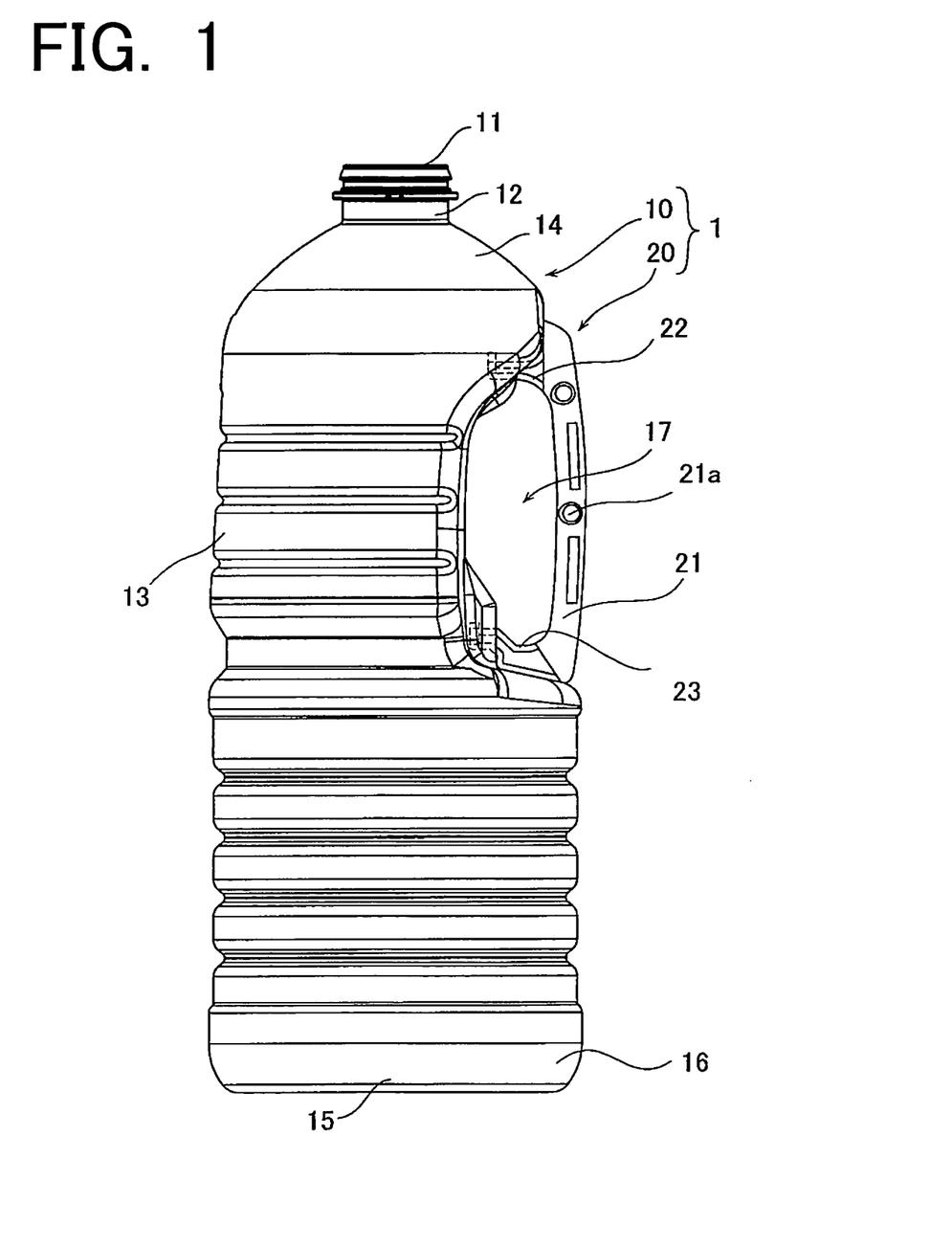
FIG. 1 is a side view showing an example of a handle-equipped container.

As shown in FIG. 1, a handle-equipped container 1 is a container to be filled with contents (liquid) such as water, and has a container body 10 and a container handle 20. The container body 10 is formed of a polyethylene terephthalate (PET) resin, and is composed of a neck 12 having an opening 11 at its upper end, a cylindrical barrel 13, a shoulder 14 connecting the neck 12 and the barrel 13 and expanding gradually from the side of the neck 12, a bottom 15 sealing an end of the barrel 13, and a heel 16 connecting the barrel 13 and the bottom 15. In an upper half of the barrel 13, a concavity 17 for a handle is formed, and the container handle 20 is disposed in the concavity 17 and attached to the container body 10.

In the container handle 20, a handle body 21 disposed along the vertical direction of the concavity 17, and an upper engaging portion 22 and a lower engaging portion 23 protruding laterally from sites near the vertically opposite ends of the handle body 21 are provided in the concavity 17 of the container body 10, so that the container handle 20 is formed in a nearly U-shaped configuration as a whole.

The container handle 20 is integrated with the container body 10 by a resin wrapping around the leading ends of the upper engaging portion 22 and the lower engaging portion 23 during formation of the container body 10 by blow molding, whereby the handle-equipped container 1 is formed.

A molding apparatus for molding such a handle-equipped container 1 will be described below.

Figure 2:
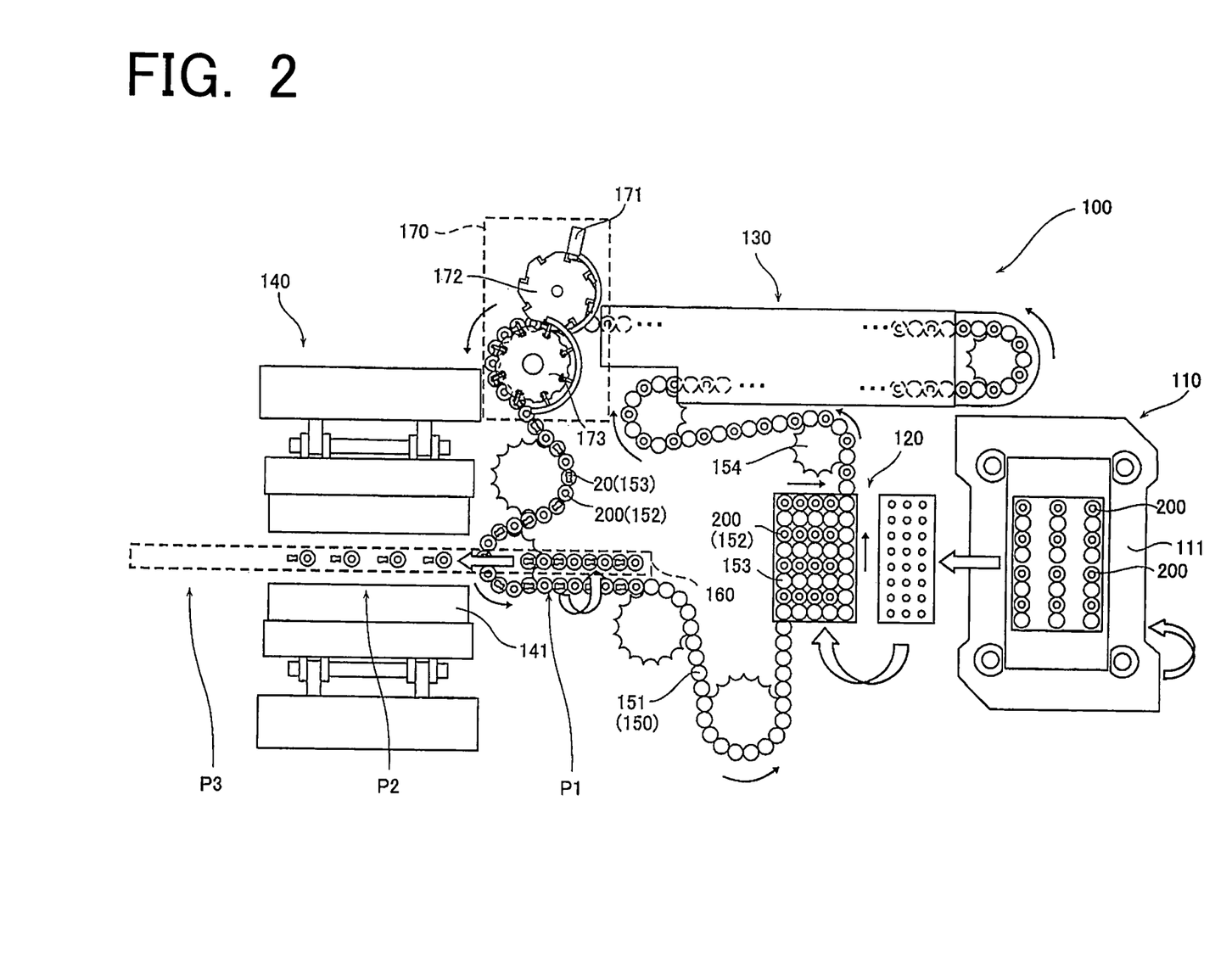
FIG. 2 is a plan view showing the entire configuration of a molding apparatus according to an embodiment of the present invention.

As shown in FIG. 2, an apparatus 100 for molding a handle-equipped container according to the present embodiment is equipped with an injection molding section 110 for injection molding preforms 200 (see FIG. 3), which will become the above-described container bodies 10; a cooling section 120 for cooling the preforms 200 molded in the injection molding section 110; a heating section 130 for heating the preforms 200; and a blow molding section 140 for blow molding the preforms 200 arranged within blow cavity molds (molds for molding) 141.

The molding apparatus 100 is also equipped with a transport section 150 including a loop-shaped transport line 151 circulating from the cooling section 120 through the heating section 130 and the blow molding section 140. Furthermore, a supply section 170 for supplying the container handles 20 to the transport section 150 is provided halfway through the transport line 151, for example, downstream of the heating section 130. The transport section 150 transports the preform 200 from the cooling section 120 to the heating section 130 along the transport line 151. The transport section 150 further transports the preform 200, which has been heated in the heating section 130, and the container handle 20, which has been supplied from the supply section 170, along the transport line 151. Then, the preform 200 and the container handle 20 are grasped by a gripping mechanism transport section 160 to be described later, and carried into the blow molding section 140 thereby. Further, the handle-equipped container 1 (see FIG. 1) formed by the blow molding section 140 is carried out of the blow molding section 140 by the gripping mechanism transport section 160.

The molding apparatus 100 according to the present invention is characterized by the gripping mechanism transport section 160 constituting the transport section 150, and the blow cavity mold 141 constituting the blow molding section 140. As the configurations of the other sections, for example, the configurations of the injection molding section 110, the cooling section 120, the heating section 130, and the supply section 170, existing configurations may be adopted. (If necessary, reference is requested to WO2013/027692 and JP-A-2013-99941, the publications by the present applicant.) Thus, the gripping mechanism transport section 160 and the blow cavity mold 141 will be described in detail below, but in connection with the configurations of the other sections, an example will be explained briefly.

The injection molding section 110 is equipped with a mold clamping mechanism 111, and clamps a core mold disposed above and a cavity mold disposed below by the mold clamping mechanism 111, although their illustrations are omitted. In the injection molding section 110, an injection space defined by the core mold and the cavity mold is charged with a resin material (raw material) by an injection device, whereby the preform 200 is injection molded.

In the injection molding section 110, assume, for example, that up to 24 (3 rows×8/row) of the preforms can be molded simultaneously. The molding apparatus 100 according to the present embodiment forms the handle-equipped containers 1. As will be described later, the container handles 20 are supplied between the preforms 200 in the transport line 151. In this case, therefore, the maximum number of the preforms simultaneously molded is 12 (3 rows×4/row).

The cooling section 120 forcibly cools the injection molded preforms 200. The preforms 200 injection molded in the injection molding section 110 are transported from the injection molding section 110 to the cooling section 120 by a transport device (not shown), and forcedly cooled in the cooling section 120. The preforms 200 cooled to a predetermined temperature in the cooling section 120 are carried out into the transport line 151 constituting the transport section 150, and transported continuously.

The preforms 200 are molded in an upright state with the neck facing upward in the injection molding section 110 and, in this state, are transported from the injection molding section 110 to the cooling section 120. The cooling section 120 has an inversion mechanism (not shown) for inverting the preforms 200, which have been transported in such an upright state, to bring them into an inverted state with the neck facing downward. During cooling in the cooling section 120, the preforms 200 are inverted by the inversion mechanism to enter an inverted state, and held by first transport jigs 152 provided in the transport section 150.

Figure 3:
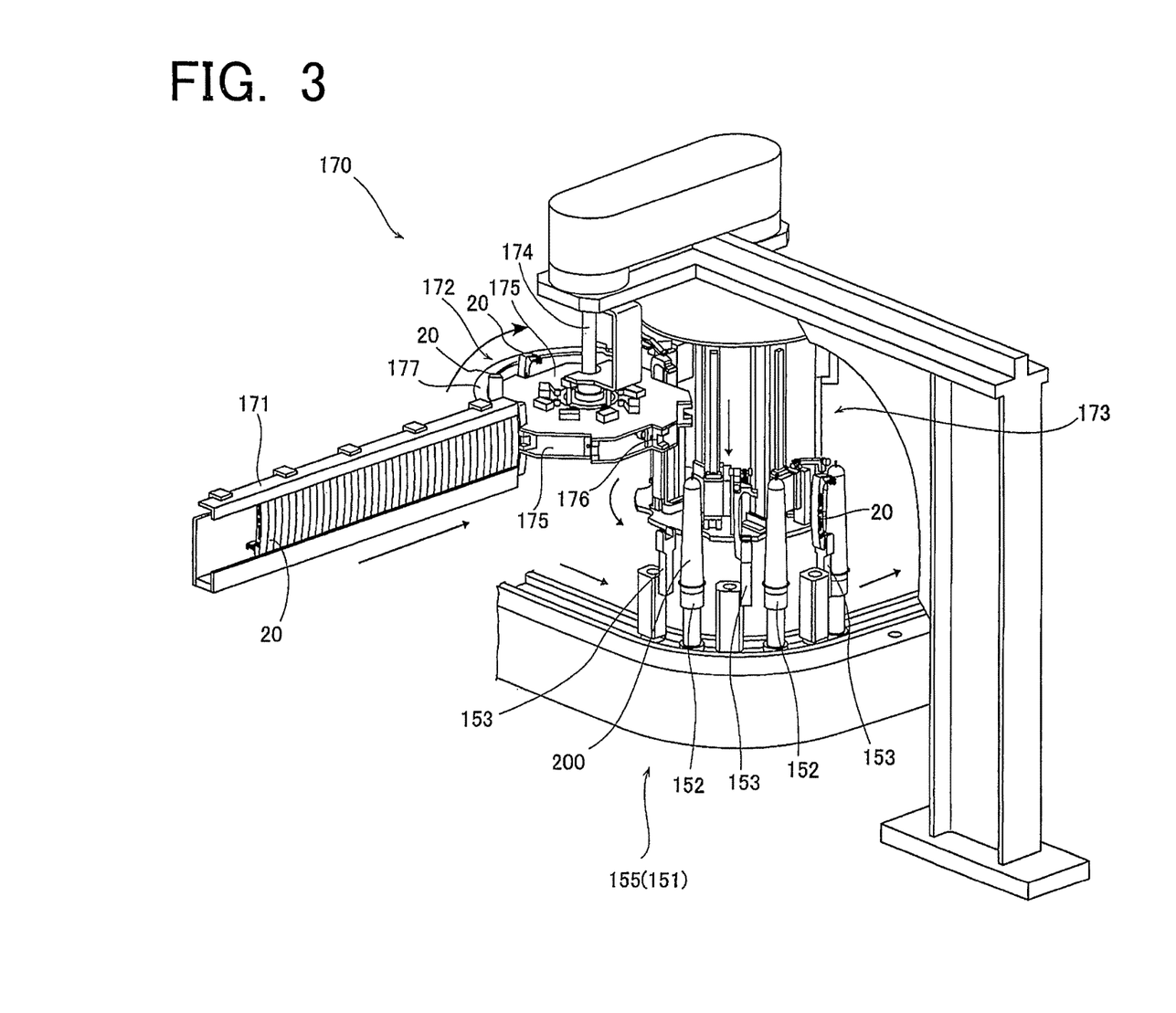
FIG. 3 is a perspective view showing an example of the configuration of a supply section.

The transport section 150 is equipped with the first transport jigs 152 for holding the preforms 200, and second transport jigs 153 for holding the container handles 20 (see FIG. 3). The transport line 151 is constituted such that the first transport jigs 152 and the second transport jigs 153 are transported continuously and alternately by the driving force of a sprocket 154, etc.

Below the cooling section 120, the first transport jigs 152 and the second transport jigs 153 are arranged in a plurality of rows. The first transport jigs 152 holding the preforms 200, and the second transport jigs 153, which are empty without holding the container handles 20, are alternately carried out into the transport line 151. Then, the preforms 200 held by the first transport jigs 152 are transported along the transport line 151 and carried into the heating section 130.

In the heating section 130, the preforms 200 cooled in the cooling section 120 are heated to a temperature suitable for stretching while being moved along the transport line 151. In the present embodiment, the preforms 200 are heated, while being allowed to rotate on their own axes, within the heating section 130, whereby the preforms 200 are each heated uniformly as a whole.

After the preforms 200 are heated by the heating section 130 in the above manner, the container handle 20 is supplied between the preforms 200 by the supply section 170. In the transport line 151, a curved transport portion 155 curved with a predetermined radius is provided downstream of the heating section 130, and the supply section 170 is provided in correspondence with the curved transport portion 155. The supply section 170 sequentially supplies the container handles 20 to the second transport jigs 153 transported in a manner alternating with the first transport jigs 152.

In the present embodiment, the supply section 170 is provided above the curved transport portion 155, and lowers the container handle 20 while rotating it in synchronism with the rotation of the second transport jig 153 in the curved transport portion 155, thereby continuously supplying the container handles 20 to the second transport jigs 153.

Concretely, as shown in FIG. 3, the supply section 170 is composed of a cartridge 171 holding a plurality of the container handles 20, and a first holding/transport mechanism 172 and a second holding/transport mechanism 173, both designed to hold and transport the container handles 20. The first holding/transport mechanism 172 holds the container handles 20 sequentially supplied from the cartridge 171, and transports them to the second holding/transport mechanism 173. The second holding/transport mechanism 173 receives the container handles 20 from the first holding/transport mechanism 172, and transports them to the second transport jigs 153.

The first holding/transport mechanism 172 holds the container handles 20 supplied from the cartridge 171, and transports them continuously, while rotating in a direction opposite to the transport direction of the second transport jigs 153. The container handle 20 held and transported by the first holding/transport mechanism 172 is released from a guide member 177, and passed on to the second holding/transport mechanism 173, when a disk-shaped member 175 has rotated through nearly a half turn. While rotating in the same direction as the transport direction of the second transport jig 153, the second holding/transport mechanism 173 sequentially receives the container handles 20 supplied from the first holding/transport mechanism 172, and transports them to the second transport jigs 153.

After the container handle 20 is held on the second transport jig 153 by the supply section 170, the first transport jig 152 holding the preform 200 and the second transport jig 153 holding the container handle 20 are transported to the blow molding section 140 along the transport line 151, and carried into the blow cavity mold 141. Concretely, the preforms 200 and the container handles 20, transported in an inverted state on the transport line 151, are inverted by an inversion mechanism (not shown) to be brought into an upright state. In this state, they are carried into the blow cavity molds 141 by the gripping mechanism transport section 160, and the handle-equipped containers 1 formed are carried out of the blow cavity molds 141.

The gripping mechanism transport section 160 allows a gripping mechanism section 160a (see FIG. 4) to grasp and transport a plurality of (e.g., 4 of) the preforms 200 and container handles 20 inverted in the upright state. That is, in the gripping mechanism transport section 160, the necks of the preforms 200 and the container handles 20 are grasped by the gripping mechanism section 160a, for example, at a preform receiving position P1. Then, the gripping mechanism section 160a is slid to a blow molding position P2 to carry the preforms 200 and the container handles 20 into the blow cavity molds 141. Moreover, the handle-equipped containers 1 formed in the blow molding section 140 (blow cavity molds 141) are grasped by the gripping mechanism section 160a, which is then transported to a withdrawal position P3, whereby the handle-equipped containers 1 are carried out of the blow molding section 140.

Figure 4:
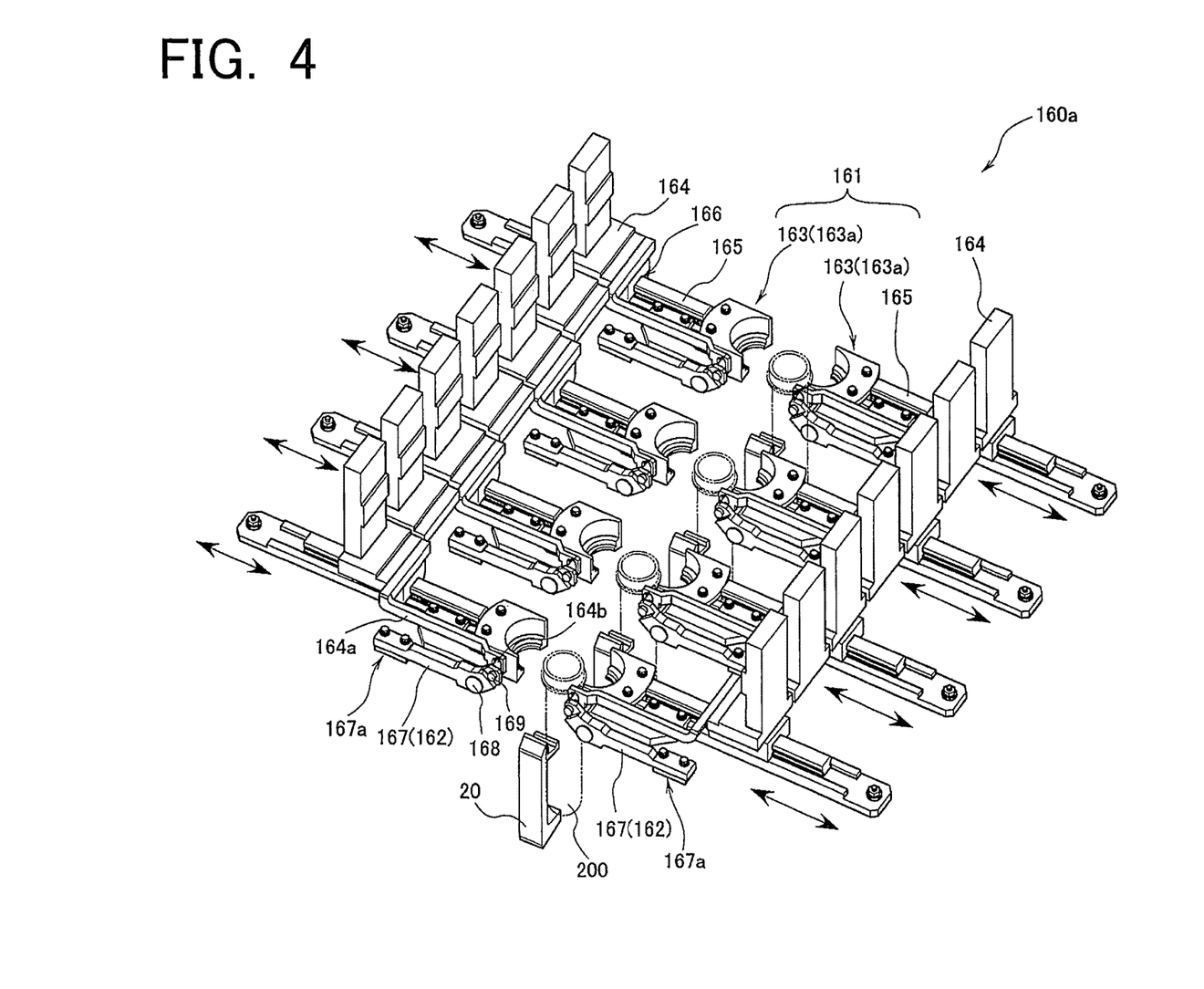
FIG. 4 is a perspective view showing the configuration of a gripping mechanism section according to the embodiment of the present invention.
Figure 5:
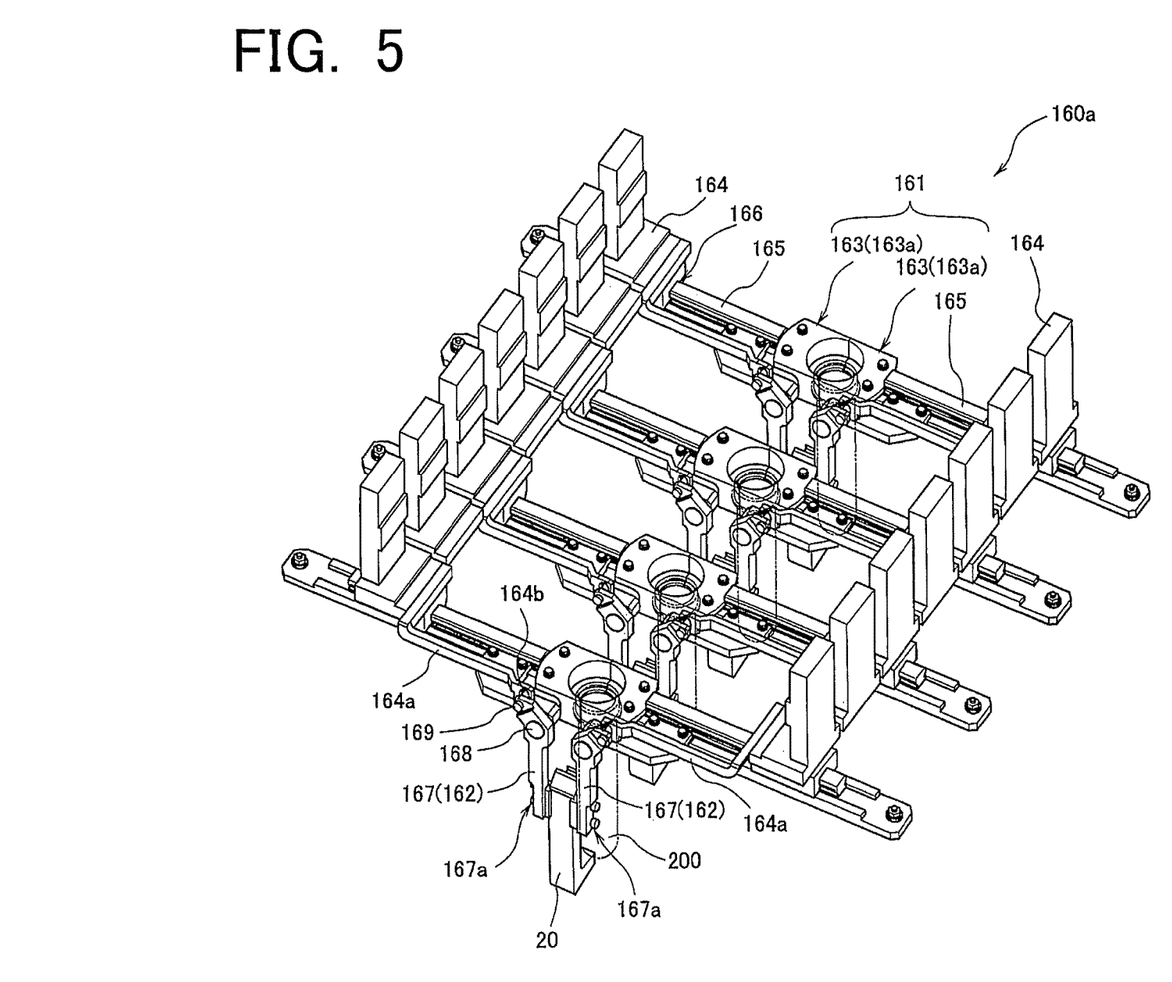
FIG. 5 is a perspective view showing the configuration of the gripping mechanism section according to the embodiment of the present invention.
Figure 6:
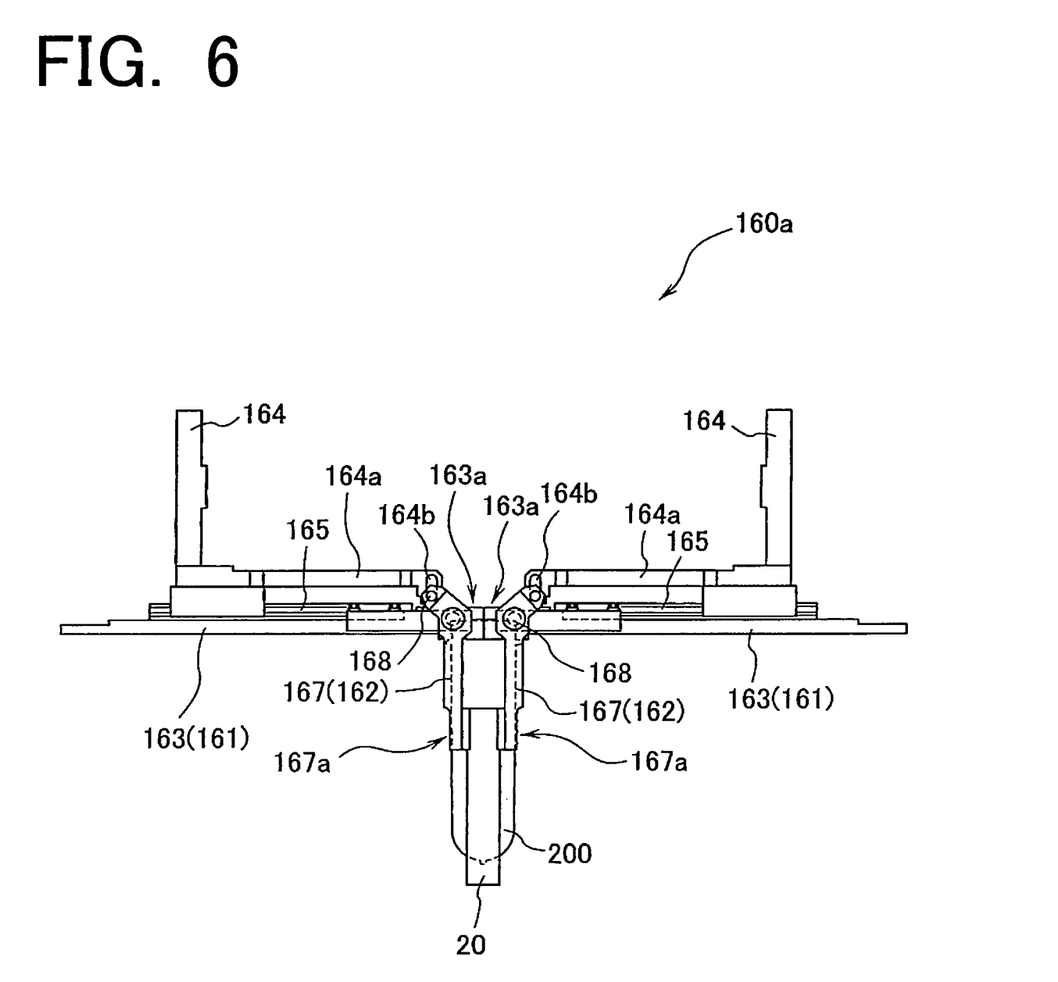
FIG. 6 is a front view showing the configuration of the gripping mechanism section according to the embodiment of the present invention.

The gripping mechanism section 160a, as shown in FIGS. 4 to 6, includes a predetermined number of (4 in the present embodiment) first gripping members 161 for grasping the preforms 200, and the predetermined number of second gripping members 162 for grasping the container handles 20. Each of the first gripping members 161 is composed of a pair of first chuck members 163 which are arranged bilaterally outwardly of the preform 200 and which have, at the leading ends, chuck portions 163a for grasping the preform 200. Each first chuck member 163 is supported rectilinearly movably by a support member 164. In the present embodiment, a rail portion 165 is provided protrusively on the upper surface of each first chuck member 163, and a guide groove 166 is provided in the bottom surface of the support member 164. Since the rail portion 165 is engaged with the guide groove 166, the first chuck member 163 is supported rectilinearly movably by the support member 164. These first chuck members 163 are configured to be movable by air cylinders (not shown), and the respective first chuck members 163 are rectilinearly moved toward the preform 200, whereby each preform 200 is sandwiched between (grasped by) the pair of first chuck members 163 (see FIGS. 5 and 6).

On the other hand, the second gripping members 162 are each composed of a pair of second chuck members 167 which have, at the leading ends, chuck portions 167a for grasping the container handle. The pair of second gripping members 162 are supported by the first chuck members 163 constituting the first gripping member 161. Concretely, in the second chuck member 167, a site near its end on the side opposite to the chuck portion 167a is fixed to the side surface of the first chuck member 163 by a support shaft 168 to be vertically pivotable.

Moreover, the second chuck member 167 is coupled to an arm portion 164a extending from the support member 164 to constitute a link mechanism. In the present embodiment, a coupling pin 169 is provided at a position of the second chuck member 167 spaced by a predetermined distance from the support shaft 168. In the arm portion 164a, on the other hand, a coupling hole 164b into which the coupling pin 169 is inserted is formed in the shape of an elongated hole. By insertion of the coupling pin 169 into the coupling hole 164b, the second chuck member 167 and the support member 164 are coupled together. In this manner, the second chuck member 167 is coupled to the support member 164 to constitute the link mechanism, whereby the second chuck member 167 is pivoted in accordance with the rectilinear movement of the first chuck member 163.

In an open state in which the first chuck member 163 does not grasp the preform 200, the second chuck member 167 is held nearly in parallel with the first chuck member 163 (see FIG. 4). When the first chuck member 163 is rectilinearly moved from this state to grasp the preform 200, the position of the support shaft 168 moves in association with the closing drive of the first chuck member 163. Thus, a force in a direction opposite to the moving direction of the first chuck member 163 acts from the arm portion 164a on the coupling pin 169. As a result, the second chuck member 167 pivots by nearly 90 degrees downward in accordance with the rectilinear movement of the first chuck member 163 to grasp the container handle 20 (see FIGS. 5 and 6).

In the gripping mechanism section 160a according to the present embodiment, as described above, the second chuck member 167 constituting the second gripping member 162 pivots in association with the rectilinear movement of the first chuck member 163 constituting the first gripping member 161. Because of this action, the preform 200 and the container handle 20 can be grasped simultaneously by the first gripping member 161 and the second gripping member 162. Furthermore, a plurality of the preforms 200 and a plurality of the container handles 20 can be grasped at the same time. Hence, the molding cycle time can be shortened, and the manufacturing costs can be cut down.

In the present embodiment, moreover, the action of the second chuck member 167 is linked to the action of the first chuck member 163 by the link mechanism. Thus, the structure of the apparatus can be simplified in comparison with a structure in which the first chuck member 163 and the second chuck member 167 are controlled separately.

At the preform receiving position P1, a predetermined number (4 in the present embodiment) of the preforms 200 and the predetermined number of the container handles 20 are grasped by the gripping mechanism section 160a of the above-described configuration. Then, the gripping mechanism section 160a, while grasping the preforms 200 and the container handles 20, is slid to the blow molding position P2 to transport the preforms 200 and the container handles into the blow cavity molds 141 of the blow molding section 140. As a mechanism for sliding the first gripping member 161 and the second gripping member 162, a publicly known one may be adopted, so that an explanation for this mechanism is omitted herein.

Under the procedure for carrying the preform 200 and the container handle 20 into the blow cavity mold 141, the first step is to transport the preform 200 and the container handle 20 to an area corresponding to each mold (i.e. blow molding position P2), with the blow cavity mold 141 being opened.

Figure 7:
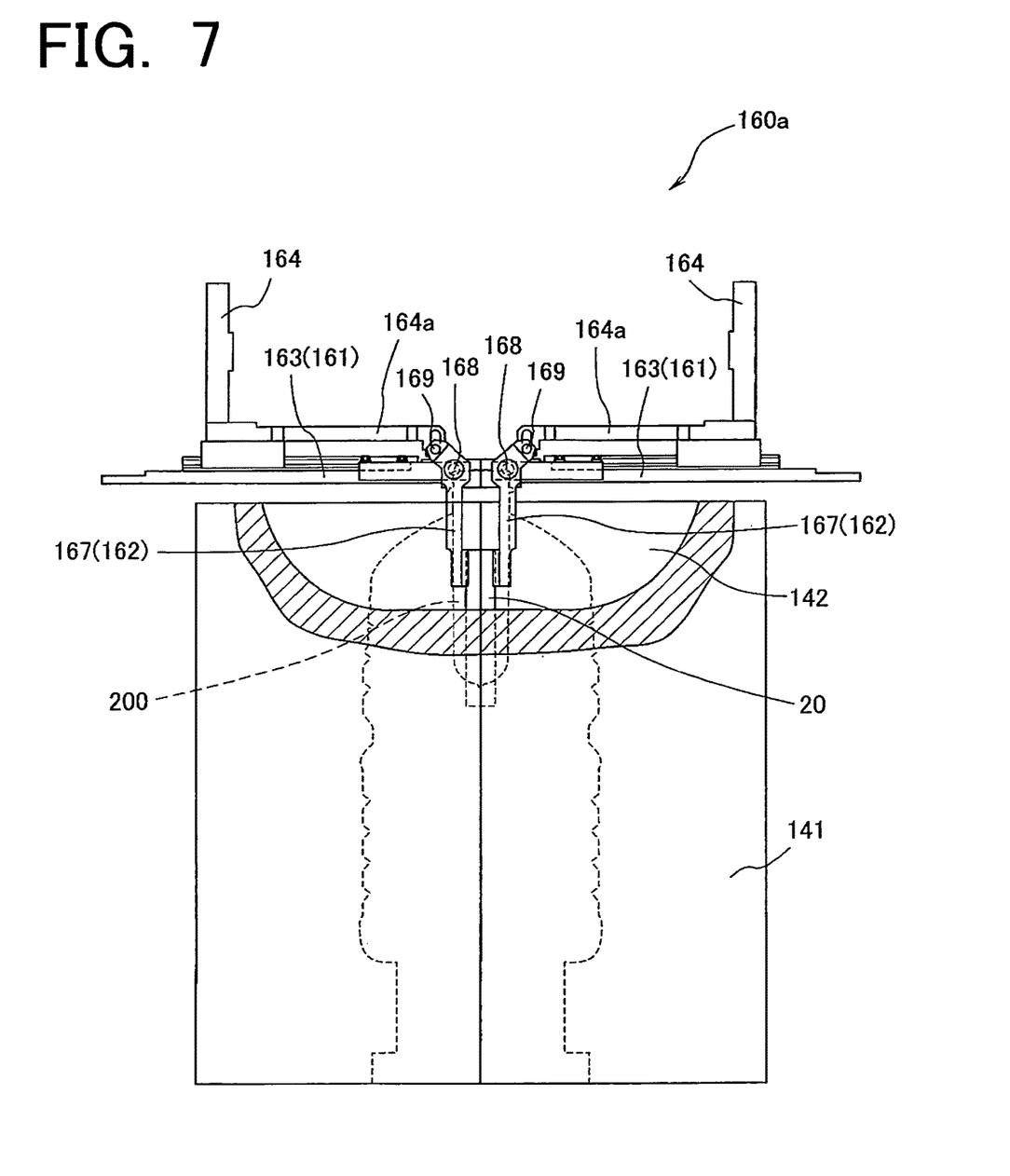
FIG. 7 is a partly sectional view showing the state of the gripping mechanism section in a blow molding section.
Figure 8:
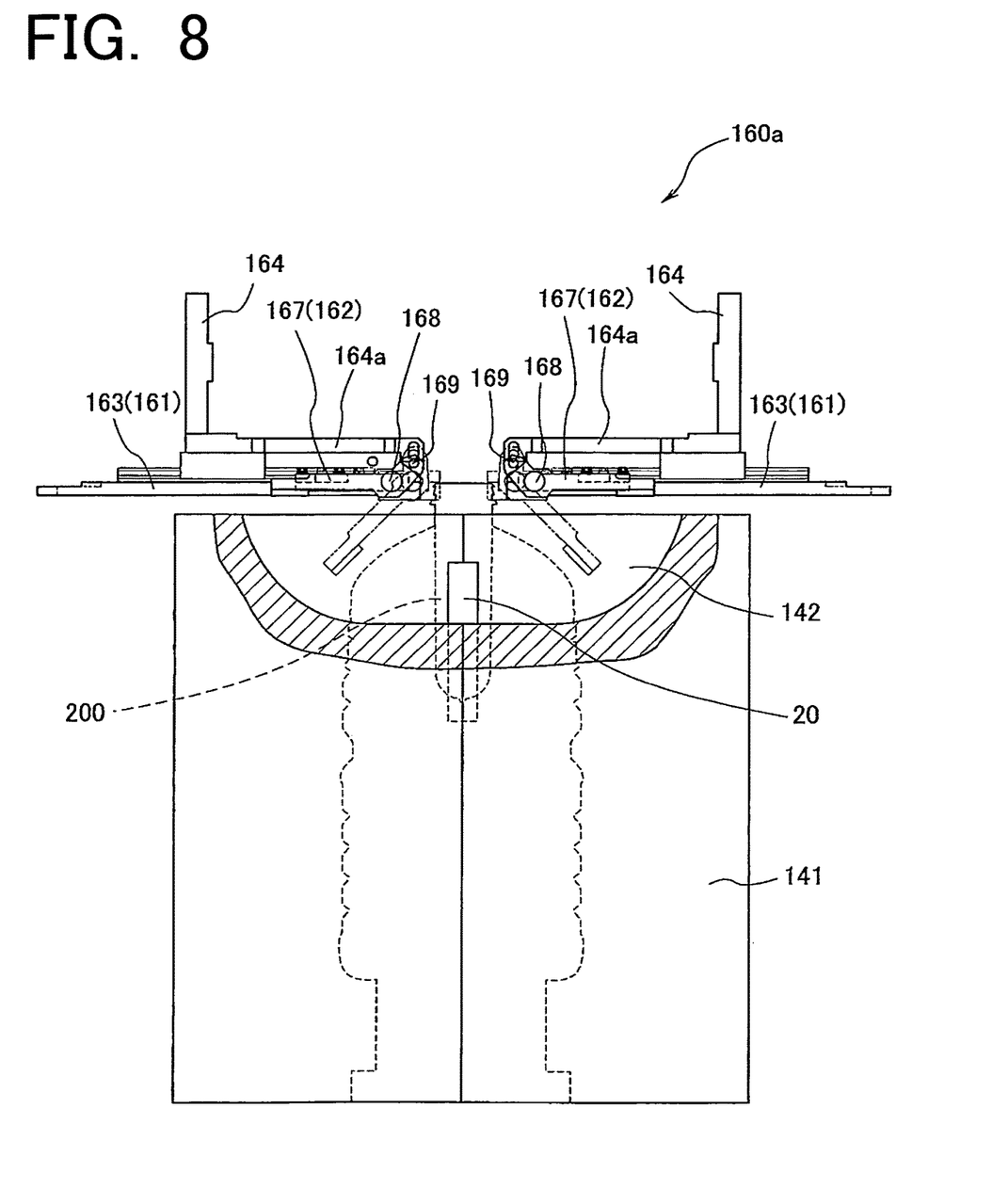
FIG. 8 is a partly sectional view showing the state of the gripping mechanism section in the blow molding section.

Then, as shown in FIG. 7, the blow cavity mold 141 is closed, with the preform 200 and the container handle 20 being grasped by the gripping mechanism section 160a. As a result, the preform 200 and the container handle 20 are accommodated within the blow cavity mold 141. Then, as shown in FIG. 8, the first gripping member 161 and the second gripping member 162 are driven to open. That is, the first chuck members 163 constituting the first gripping member 161 are rectilinearly moved to release the preform 200, and the second chuck members 167 constituting the second gripping member 162 are pivoted upward in association with the rectilinear movement of the first chuck members 163 to release the container handle 20. Then, the preform 200 is blow molded in the blow cavity mold 141, whereby the handle-equipped container 1 (see FIG. 1) is formed. The formed handle-equipped container 1 is grasped by the gripping mechanism section 160a in the above-mentioned manner, and the gripping mechanism section 160a is transported to the withdrawal position P3. In this manner, the handle-equipped container 1 is carried out of the blow molding section 140.

The gripping mechanism transport section 160 is equipped with two of the gripping mechanism sections 160a so that the carry-in of the preform 200 and the container handle 20 into the blow molding section 140 and the carry-out of the handle-equipped container 1 from the blow molding section 140 are performed simultaneously, although this is not shown. Moreover, the gripping mechanism section 160a is configured such that the pitch between the preforms 200 can be varied when the preforms 200 and the container handles 20 are carried into the blow molding section 140. That is, the gripping mechanism section 160a, at the preform receiving position P1, grasps the preforms 200 and the container handles 20 arranged at a relatively small pitch, but adjusts the pitch between the preforms 200 to a predetermined blow pitch during transport to the blow molding position P2. For carry-out of the formed handle-equipped containers 1, the gripping mechanism section 160a moves the handle-equipped container 1 without changing the pitch between them.

Figure 9:
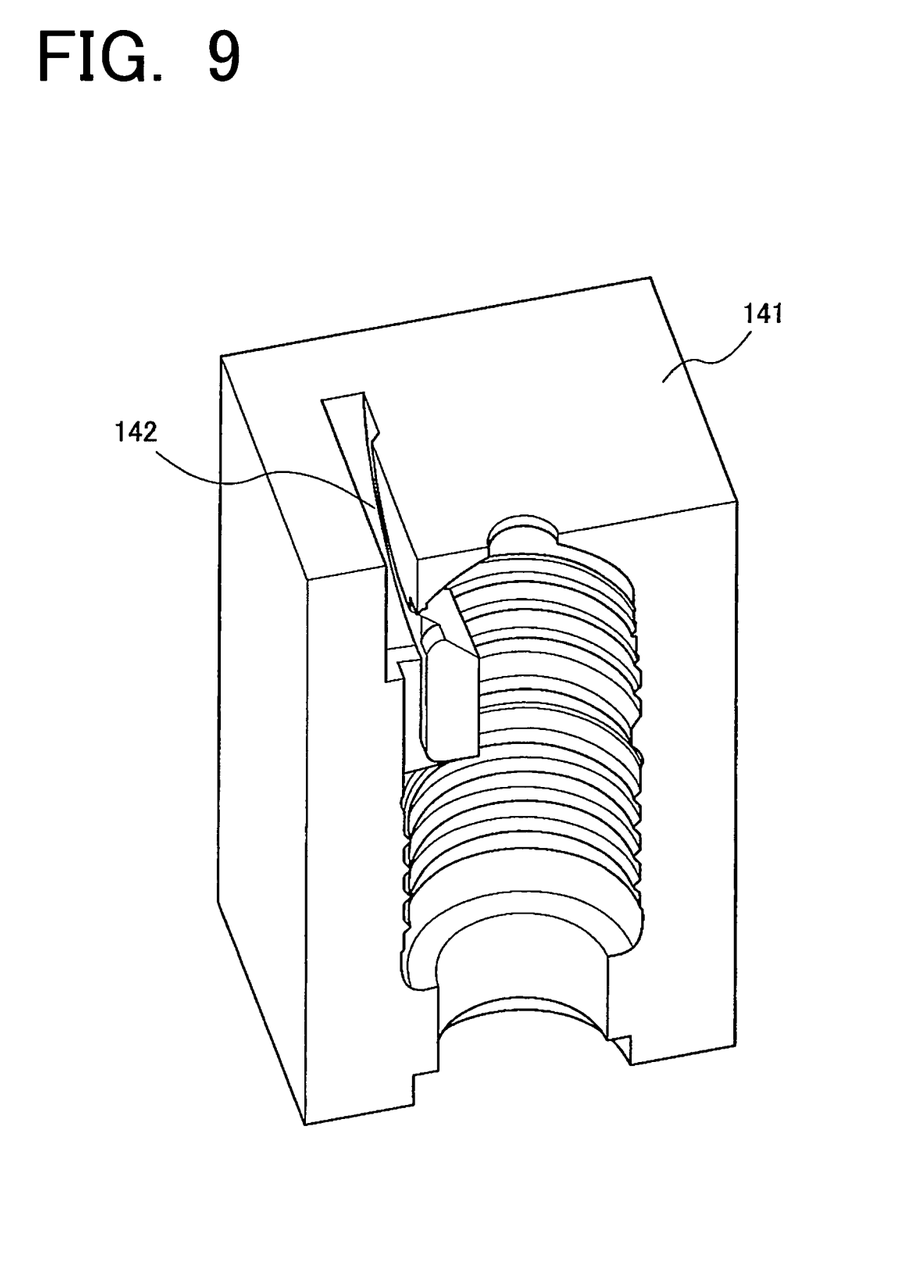
FIG. 9 is a perspective view showing a mold according to the embodiment of the present invention.

As mentioned above, the second chuck member 167 pivots about the support shaft 168 in accordance with the rectilinear movement of the first chuck member 163. For this purpose, the blow cavity mold 141 is provided with a retreat portion 142 for permitting the pivoting (movement) of the second chuck member 167 associated with the action of the first chuck member 163. In the present embodiment, the blow cavity mold 141 is provided in correspondence with the preform 200 and the container handle 20, and the retreat portion 142 is provided in a slit shape in each blow cavity mold 141, as shown in FIG. 9.

As stated above, the retreat portion 142 is provided in the blow cavity mold 141. Even when the first chuck members 163 are driven to open, with the blow cavity molds 141 being closed, therefore, the second chuck members 167 are moved within the retreat portions 142, and opened satisfactorily without interference by the blow cavity molds 141.

Figure 10:
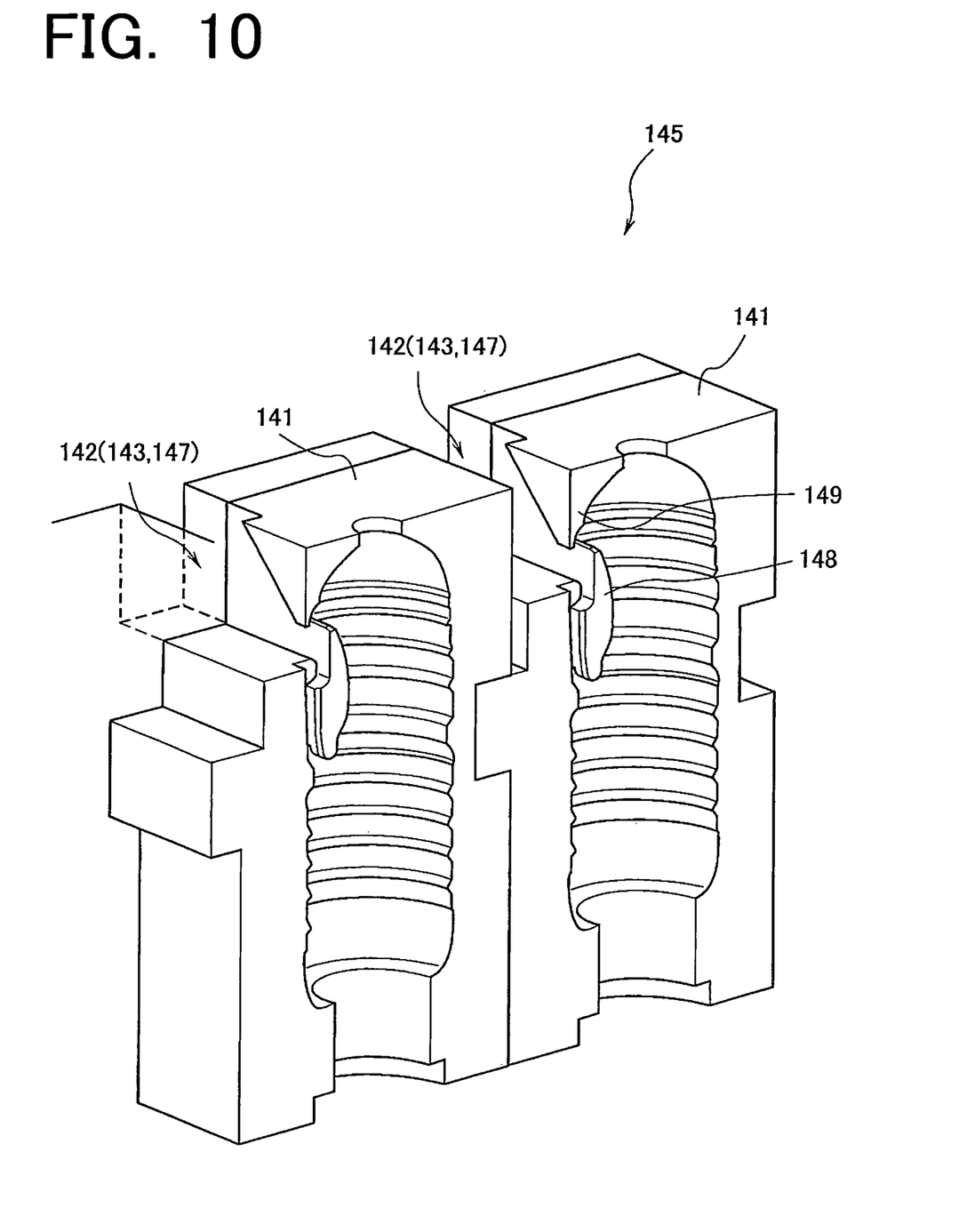
FIG. 10 is a perspective view showing a mold unit according to the embodiment of the present invention.

The retreat portion 142 is not limited in configuration, as long as it permits the movement of the second chuck member 167 associated with the action of the first chuck member 163. If a plurality of the blow cavity molds 141 are engaged for integration to constitute a mold unit 145 capable of molding a plurality of hollow containers simultaneously, for example, the retreat portion 142 may be formed between two of the blow cavity molds 141 arranged adjacently, for example, as shown in FIG. 10. In this illustrated example, the blow cavity molds 141 are fixed to a blow base 146, and a cutout 143 is formed in the corner of one of the adjacent blow cavity molds 141. That is, the cutout 143 is formed by cutting out a side surface part of the blow cavity mold 141 nearly in the shape of a rectangular parallelepiped. In the blow base 146, moreover, a groove part 147 is provided at a position corresponding to the cutout 143. Thus, the retreat portion 142 is defined by the cutout 143, and the groove part 147 continued from the cutout 143.

In such a configuration, the second chuck members 167 can be satisfactorily opened, even when the blow cavity molds 141 are closed as mentioned above (see FIG. 8). It is preferred for the retreat portion 142 to be defined by the cutout 143 and the groove part 147. Depending on the movable range of the second chuck member 167, however, the retreat portion 142 may be composed of the cutout 143 alone.

Besides, the blow cavity mold 141 is provided with a handle support portion 148 for supporting the container handle 20, and is also provided with a positioning pin for positioning the container handle 20, although its illustration is omitted. Upon insertion of this positioning pin into a reference pin 21a (see FIG. 1) provided in the handle body 21, for example, the container handle 20 is held at a proper position within the blow cavity mold 141. Furthermore, the blow cavity mold 141 is provided with a handle upper support 149 for contacting a part near the upper end of the handle body 21 to support the container handle 20.

Even when the container handle 20 is held at the proper position by the positioning pin, as mentioned above, it is likely for the container handle 20 to be inclined, with this positioning pin as a fulcrum. By supporting the part near the upper end of the handle body 21 by the handle upper support 149, the inclination or cracking of the container handle 20 can be suppressed, even if a pressing force from the expanding preform is exerted. Moreover, the assembly of the container handle 20 to an improper position of the preform can be inhibited.

The embodiment of the present invention has been described as above. However, the present invention is not limited to the above embodiment, but can be changed or modified, as appropriate, without departing from the spirit and scope of the invention.

Figure 11:
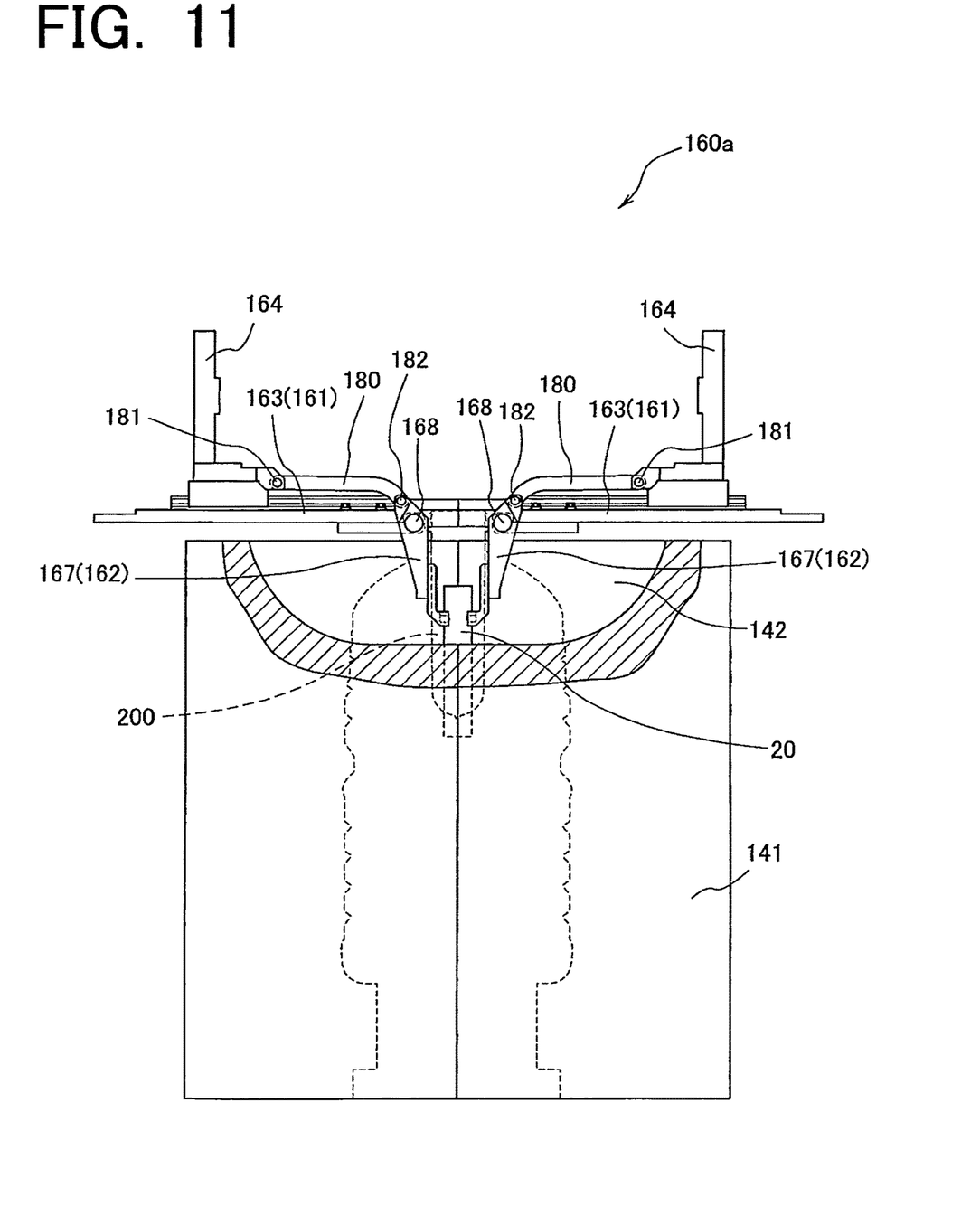
FIG. 11 is a front view showing other example of the gripping mechanism section according to the embodiment of the present invention.

In the above embodiment, for example, the coupling pin 169 is engaged with the coupling hole 164b, the elongated hole, whereby the second chuck member 167 is coupled to the arm portion 164a of the support member 164. However, the structure for coupling the second chuck member 167 to the support member 164 is not limited to the above structure. As shown in FIG. 11, for example, the second chuck member 167 and the support member 164 may be coupled together by an arm member 180, and the arm member 180 may be pivotable at its junction 182 with the second chuck member 167 and at its junction 181 with the support member 164.

Figure 12:
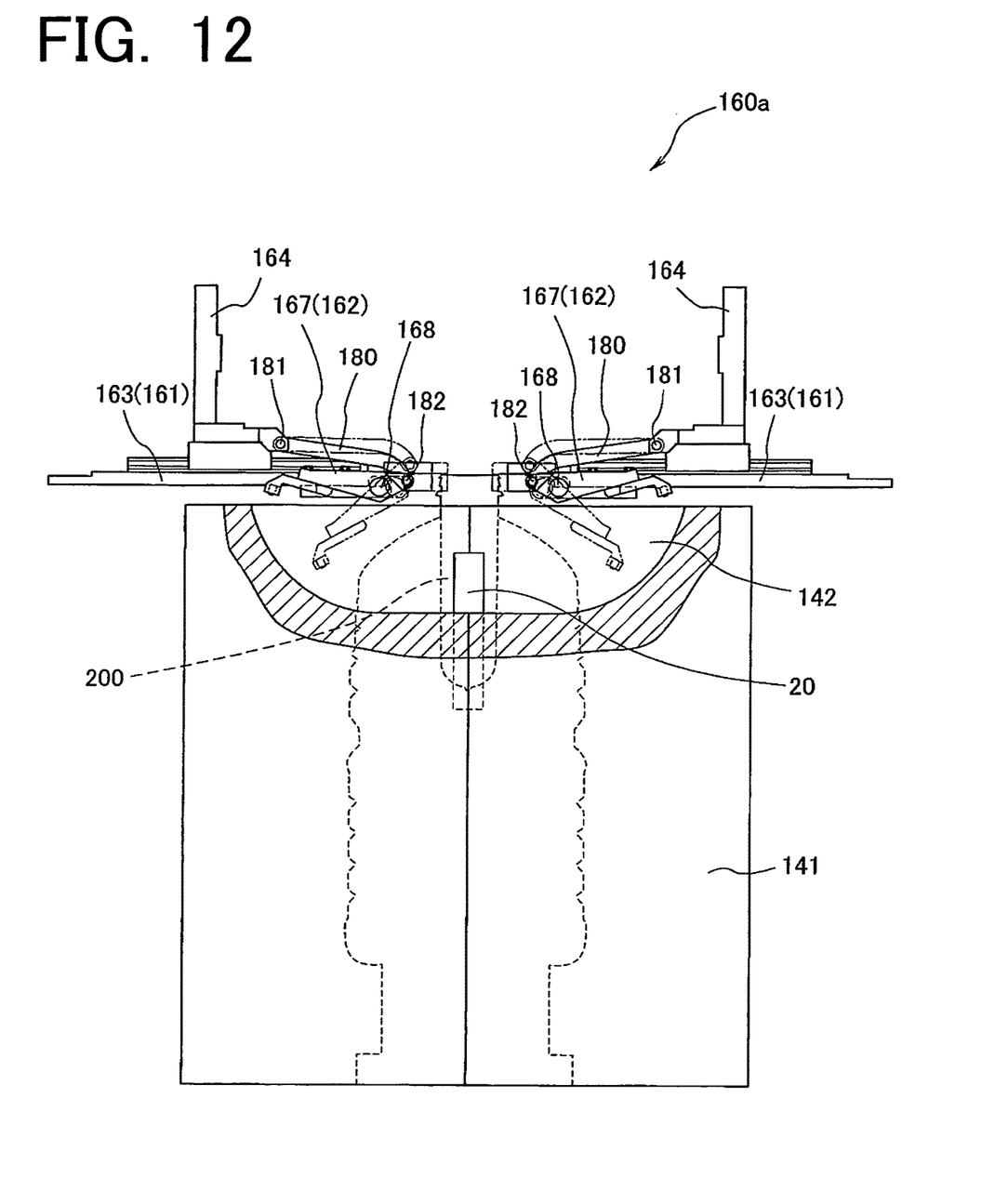
FIG. 12 is a front view showing the other example of the gripping mechanism section according to the embodiment of the present invention.

In such a configuration as well, the second chuck member 167 acts in association with the action of the first chuck member 163. In this example, as shown in FIG. 12, when the first chuck member 163 is driven for opening, the junctions 181, 182 of the arm member 180 are pivoted, whereby the arm member 180 sinks downward about the junction 181 as the fulcrum to open the second chuck member 167. It goes without saying that even in such a configuration, the preform 200 and the container handle 20 can be grasped simultaneously by the first gripping member 161 and the second gripping member 162. Hence, the molding cycle time can be shortened, and the manufacturing costs can be cut down.

EXPLANATIONS OF LETTERS OR NUMERALS

100 Molding apparatus
110 Injection molding section
111 Mold clamping mechanism
120 Cooling section
130 Heating section
140 Blow molding section
141 Blow cavity mold (mold for molding)
142 Retreat portion
143 Cutout
145 Mold unit
146 Blow base
147 Groove part
148 Handle support portion
149 Handle upper support
150 Transport section
151 Transport line
152 First transport jig
153 Second transport jig
154 Sprocket
155 Curved transport portion
160 Gripping mechanism transport section
160a Gripping mechanism section
161 First gripping member
162 Second gripping member
163 First chuck member
164 Support member
164a Arm portion
164b Coupling hole
165 Rail portion
166 Guide groove
167 Second chuck member
168 Support shaft
169 Coupling pin
170 Supply section
171 Cartridge
172 First holding/transport mechanism
173 Second holding/transport mechanism
175 Disk-shaped member
177 Guide member
180 Arm member
181, 182 Junction
200 Preform

The invention claimed is:

1. An apparatus for molding a handle-equipped container, comprising:
   a blow molding section for blow molding a preform, with the preform and a container handle being arranged within a mold, to form a handle-equipped container; and
   a transport section for transporting the preform and the container handle to the blow molding section,
   wherein the transport section has a gripping mechanism transport section that allows a gripping mechanism section to grasp a neck of the preform and the container handle, and that moves the gripping mechanism section to transport the preform and the container handle, and
   the gripping mechanism section comprises a first gripping member having a pair of first chuck members for grasping the preform, and a second gripping member having a pair of second chuck members for grasping the container handle in association with an action of the first gripping member, wherein the first chuck member is supported rectilinearly movably by a support member, the second chuck member is supported vertically pivotably by the first chuck member and is coupled to the support member to constitute a link mechanism, and the second chuck member is pivoted in association with a rectilinear movement of the first chuck member.

2. A mold for use in the apparatus for molding a handle-equipped container according to claim 1, wherein the mold has a retreat portion permitting a movement of the second chuck member associated with an action of the first chuck member.

3. The mold according to claim 2, wherein the retreat portion is formed in a slit shape.

4. A mold unit which is composed of a plurality of the molds according to claim 2 engaged with each other for integration, and which can simultaneously form a plurality of the containers, wherein:

a cutout is formed in a corner of one of the molds adjacent to each other, and the retreat portion is defined between the adjacent molds by the cutout.

\* \* \* \* \*